(12) United States Patent
Smith

(10) Patent No.: US 8,570,273 B1
(45) Date of Patent: Oct. 29, 2013

(54) INPUT DEVICE CONFIGURED TO CONTROL A COMPUTING DEVICE

(75) Inventor: David Alan Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 162 days.

(21) Appl. No.: 13/111,476

(22) Filed: May 19, 2011

Related U.S. Application Data

(60) Provisional application No. 61/346,713, filed on May 20, 2010.

(51) Int. Cl.
G09G 5/00 (2006.01)
G09G 5/08 (2006.01)
G06F 3/033 (2013.01)
G06F 3/041 (2006.01)

(52) U.S. Cl.
USPC ............................ 345/156; 345/161; 345/173

(58) Field of Classification Search
None
See application file for complete search history.

(56) References Cited

U.S. PATENT DOCUMENTS

| | | | | |
|---|---|---|---|---|
| 4,722,625 A * | 2/1988 | O'Brien | ........................... | 401/6 |
| 4,954,817 A * | 9/1990 | Levine | ........................... | 345/179 |
| 5,481,265 A * | 1/1996 | Russell | ........................... | 341/22 |
| 5,489,922 A | 2/1996 | Zloof | | |
| 5,832,296 A * | 11/1998 | Wang et al. | ............... | 340/539.22 |
| 6,297,808 B1 * | 10/2001 | Yang | ............................ | 345/167 |
| 6,778,380 B2 * | 8/2004 | Murray, Jr. | .................... | 348/734 |
| 7,061,466 B1 * | 6/2006 | Moore et al. | ................ | 345/156 |
| 7,453,436 B2 * | 11/2008 | Ruiz | ............................. | 345/156 |
| 2003/0038783 A1 | 2/2003 | Baughman | | |
| 2003/0142065 A1 * | 7/2003 | Pahlavan | ....................... | 345/156 |
| 2004/0080493 A1 | 4/2004 | Kenin | | |
| 2004/0174337 A1 * | 9/2004 | Kubota et al. | ................. | 345/156 |
| 2006/0164383 A1 * | 7/2006 | Machin et al. | ................ | 345/156 |
| 2007/0176894 A1 * | 8/2007 | Abe | .............................. | 345/156 |
| 2008/0278821 A1 * | 11/2008 | Rieger | .......................... | 359/630 |
| 2009/0153477 A1 | 6/2009 | Saenz | | |
| 2010/0156783 A1 | 6/2010 | Bajramovic | | |
| 2010/0188336 A1 | 7/2010 | Ng et al. | | |
| 2010/0328205 A1 | 12/2010 | Cheng | | |

OTHER PUBLICATIONS

Jaypee Online, "Genius Ring Mouse: Ultraportable Wireless Mouse," Feb. 11, 2011, 6 pages.
Murph, D., "Genius Ring Mouse slips around your finger, cues up Beyonce jams," AOL, Sep. 8, 2010, 5 pages.
"USB Fingerprint Touchpad Touch Pad Optical Ring Mouse," Amazon.com, Aug. 6, 2010, 6 pages.
"Invention Awards a New Breed of Mouse," Popular Science, May 14, 2007, 4 pages.
Blain, L., "The 3D air-mouse you wear as a ring," Personal Computing, Apr. 20, 2007, 6 pages.
Ciocirlie, I, "The Ring Mouse is Here," Softpedia, Jun. 14, 2007, 2 pages.
Frucci, "Ring mouse causes existential crisis in Giz writer," Gizmodo.com, Jun. 11, 2007, 2 pages.

\* cited by examiner

*Primary Examiner* — Nicholas Lee
(74) *Attorney, Agent, or Firm* — Withrow & Terranova, PLLC

(57) ABSTRACT

An input device configured to control a communicatively coupled remote processor is disclosed. The input device includes a band that is configured to at least partially encircle a digit of a hand. A connection member suspends a platform above an exterior surface of the band. The platform is configured to be manipulated by a second digit of the hand. A processor is configured to determine event data based on the manipulation of the platform. The event data is transmitted via a radio frequency (RF) transmitter in a control signal to the communicatively coupled remote processor.

29 Claims, 14 Drawing Sheets

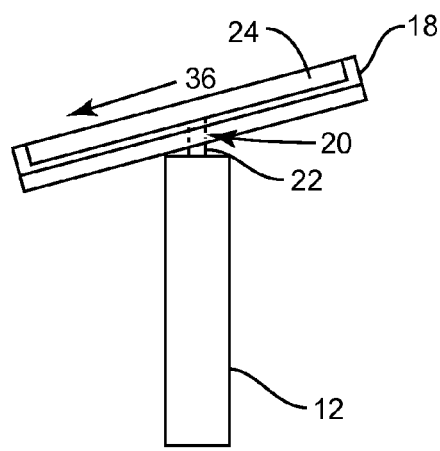
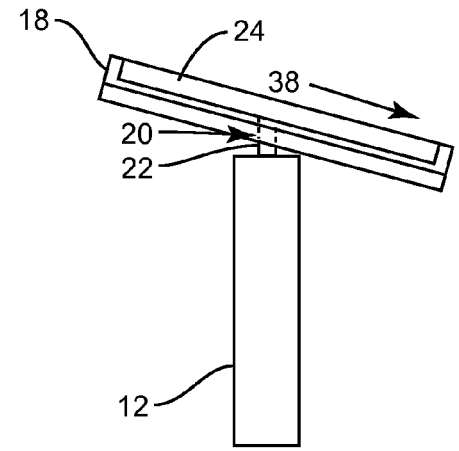
FIG. 2A
FIG. 2B
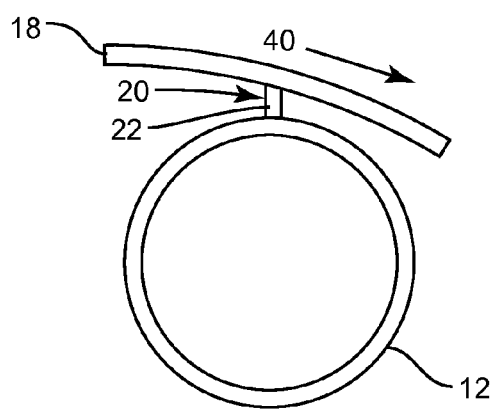
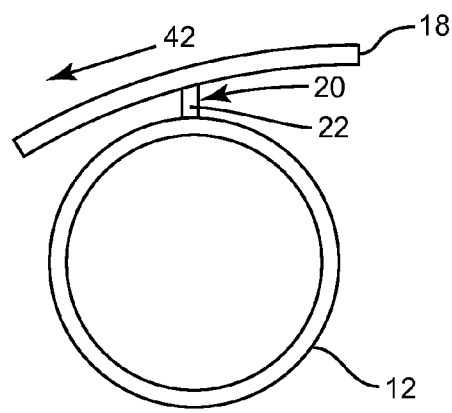
FIG. 2C
FIG. 2D

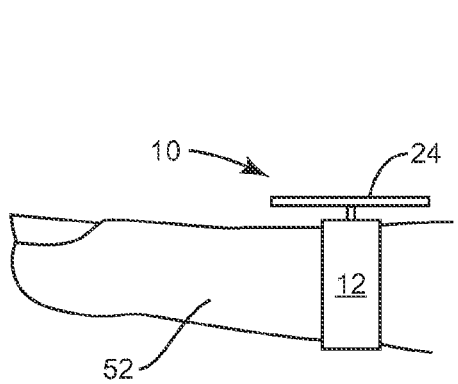
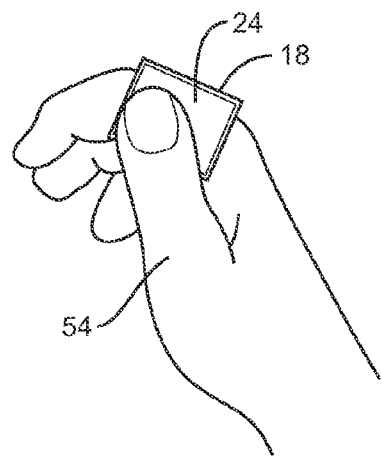
FIG. 4A  FIG. 4B
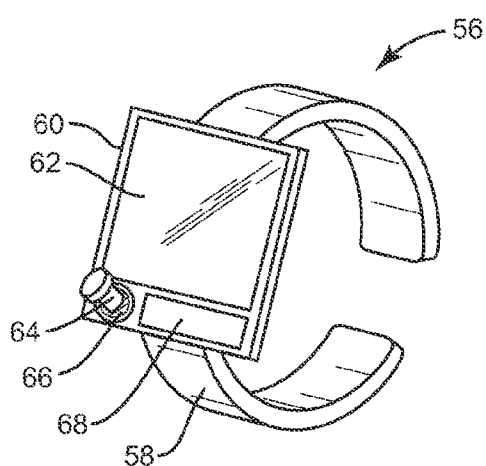
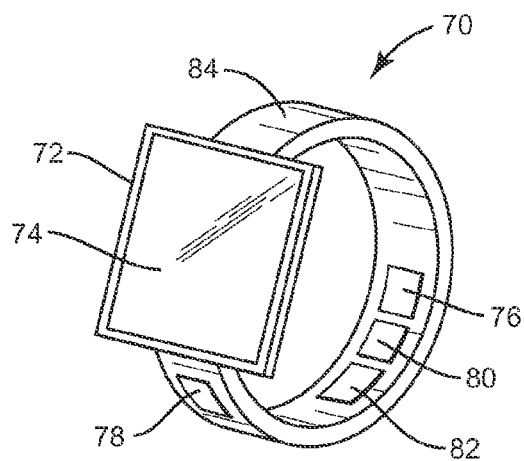
FIG. 5  FIG. 6
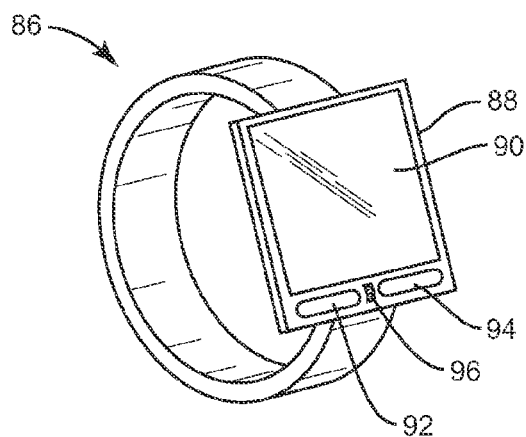
FIG. 7

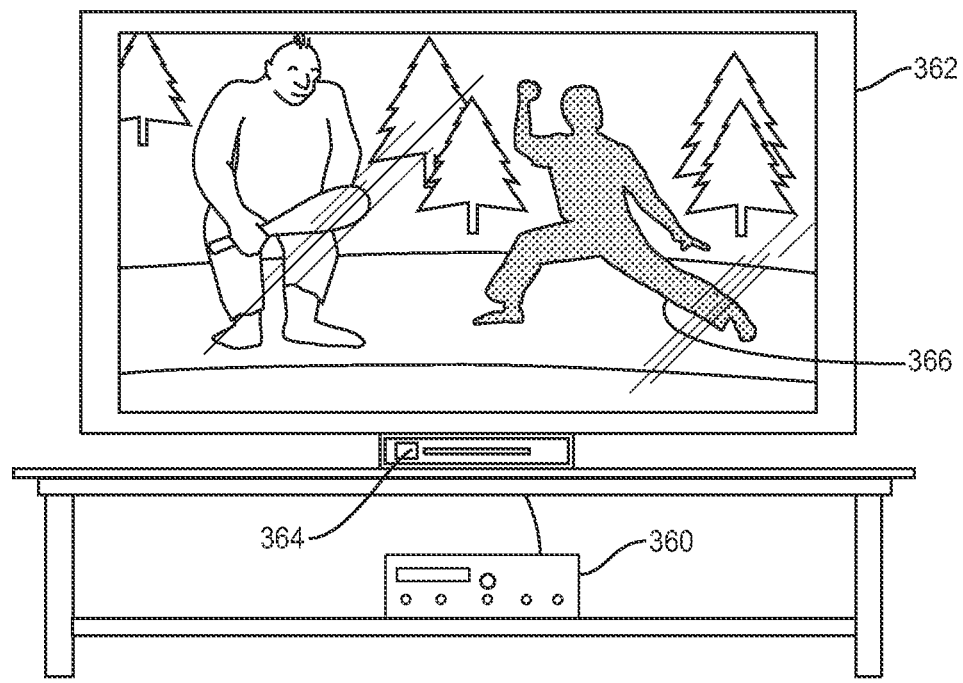
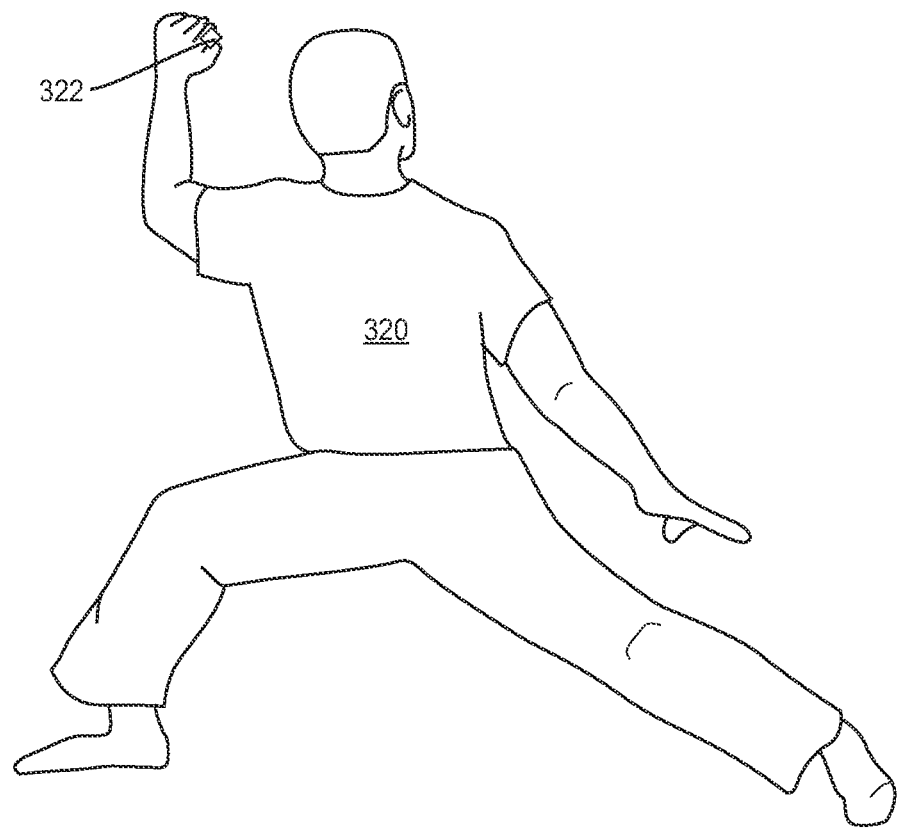
*FIG. 16*

INPUT DEVICE CONFIGURED TO CONTROL A COMPUTING DEVICE

RELATED APPLICATION

This application claims the benefit of provisional patent application Ser. No. 61/346,713, filed May 20, 2010, the disclosure of which is hereby incorporated herein by reference in its entirety.

FIELD OF THE DISCLOSURE

Embodiments disclosed herein relate generally to user input devices, and in particular to an input device that can be worn on a finger to control a communicatively coupled computing device.

BACKGROUND

Mice, trackballs, joysticks, and touchpads are input devices that permit a human to interact with a computing device. Such devices enable the user to intuitively access, generate, store, and otherwise manipulate data accessible by the computing device. Many input devices remain relatively fixed with respect to a surface during use, such as a keyboard and a joystick. Other input devices, such as a mouse or trackball, move with respect to a surface, but are limited to primarily two-dimensional movements.

Computing interfaces are becoming increasingly sophisticated. User interfaces are now capable of tracking the movement of a human's body, and interpret particular movements as inputs for the user interface to process. Conventional input devices, such as mice, joysticks, trackballs, and the like, which require a desk surface for proper operation, are frequently inconvenient to use with such user interfaces. Accordingly, what is needed is an input device that is not directly or indirectly tethered to a desk surface.

SUMMARY

Embodiments disclosed herein relate to an input device for controlling a computing device. In one embodiment, the input device includes a band that is configured to at least partially encircle a first finger (or digit) of a hand. A platform configured to be manipulated by a second digit of the same hand, or a second digit of a different hand, is suspended above an exterior surface of the band. The platform is coupled to a first end portion of a connection member. A second end portion of the connection member is coupled to the band. The input device includes a transmitter, such as a radio frequency (RF) or optical transmitter, and a control system. The control system includes a processor, and is configured to determine first event data in response to a manipulation of the platform. The control system transmits a control signal via the RF transmitter that includes the first event data. The computing device receives the control signal and interprets the first event data as corresponding to a particular action with respect to a user interface of the computing device.

In one embodiment, the platform comprises a touch-sensitive surface. A touch of the platform by the second digit causes the control system to send the first event data to the computing device. If the first event data corresponds to a simple touch of the touch-sensitive surface, the computing device may interpret the first event data as a selection of an item in a graphical user interface depicted on the computing device, for example. In another example, if the first event data corresponds to a sliding motion across the touch-sensitive surface, the computing device may request to move a cursor across the user interface in correspondence with the direction and length of the sliding motion of the second digit.

In one embodiment, the platform may be pivotally coupled with respect to the first end portion of the connection member. Canting the platform in a first direction with respect to the connection member may cause first event data to be sent to the computing device that corresponds to a first action, such as a right mouse click. Canting the platform in a second direction with respect to the connection member may cause first event data to be sent to the computing device that corresponds to a second action, such as a left mouse click. In an alternate embodiment, the platform may be fixed with respect to the first end portion of the connection member, and the second end portion of the connection member may be movable with respect to the band. In such embodiment, the connection member moves with respect to the band to enable canting of the platform.

In another embodiment, the platform may comprise additional input receptors, such as one or more of a selectable button, a trackball, or a toggle pointer, for example. Manipulation of a particular input receptor results in the determination of particular event data which may then be transmitted to the computing device. Manipulation of an input receptor may result in multiple event data being continuously provided to the computing device, as may occur, for example, when a trackball input receptor is rotated for a period of time.

In another embodiment, an input receptor comprises a motion sensor. The motion sensor detects movement of the input device from a first location in space to a second location in space. Based on the movement, second event data is determined and transmitted to the computing device. The second event data may be determined substantially concurrently with the determination of the first event data, and both the first event data and the second event data may be transmitted concurrently to the computing device. For example, the user may manipulate the platform with the second digit while concurrently moving his hand from a first location in space to a second location in space. The first event data corresponding to the manipulation of the platform may be interpreted by the computing device and result in first behavior on the computing device, and the second event data corresponding to the movement of the hand from the first location in space to the second location in space may be interpreted by the computing device and result in second behavior on the computing device.

In another embodiment, the concurrent detection of a manipulation of the platform in conjunction with the detection of a movement of the hand from a first location in space to a second location in space may result in the determination of third event data that differs from both the first event data determined by the manipulation of the platform and the second event data determined in response to the movement of the hand from the first location in space to the second location in space.

Among other features, the input device is well suited for use in a dynamic computing environment, such as a human interactive environment, where a user interacts with the computing environment while he is able to move about freely in real-world space.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 2A-2B are side views of an input device according to one embodiment;

FIGS. 2C-2D are edge views of the input device illustrated in FIGS. 2A-2B;

FIGS. 4A-4B illustrate the input device in operation, according to one embodiment;

FIGS. 5-7 are perspective views of input devices according to other embodiments;

FIG. 16 is a diagram illustrating use of the input device illustrated in FIGS. 15A-15C in conjunction with a gaming system, according to one embodiment.

DETAILED DESCRIPTION

Figure 1A:
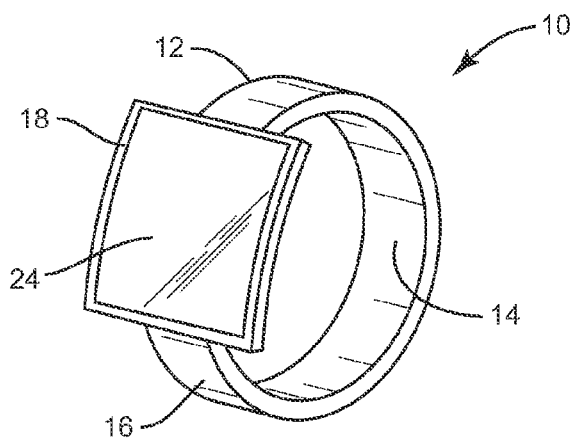
FIG. 1A is perspective view of an input device according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to an input device for use with a communicatively coupled computing device. The computing device operates in a computing environment, interprets event data determined by the input device, and acts in response thereto. The input device may be worn on one or more digits of a user's hand, and can be manipulated by the user to control actions of the computing environment via the determined event data. Such input device may be referred to herein as a "ring peripheral" or "ring mouse," because the input device is preferably worn on a finger of a user's hand. The input device can include one or more input receptors that, in response to a manipulation, generate receptor data corresponding to the manipulation. A manipulation may comprise movement of the input receptor and/or manipulation of the input receptor by a digit (i.e., a finger) of the user. Event data is determined based on the receptor data, and the event data is conveyed, or transmitted, in a control signal to the computing device in the computing environment. Such event data can include positional data, magnitude data, speed data, force data, button selection data, digit motion data, or any other data detectable by an input receptor. The event data can be communicated (wirelessly or over wires) to the computing device, which interprets the event data and acts in response to the event data. Such actions can comprise, for example, user interface drag and drop actions, highlighting actions, copying actions, or the like. Thus, the input device controls aspects of the computing device.

In one embodiment, the user may manipulate the input device to select objects presented in the computing environment, to move such objects about the computing environment, such as moving an object from a first location in a user interface to a second location in the user interface, and to otherwise interact with the computing environment. The input device may enable any subset or superset of interactions possible through a conventional pointer device (e.g., mouse, joystick, trackball, touchpad, keyboard, etc.) as well as many interactions having no current equivalent. For example, in one embodiment, an input receptor comprises a motion sensor, such as an accelerometer, a six degree of freedom or other type of gyroscope, or an inertial measurement unit (IMU) comprising both an accelerometer and a gyroscope. Thus, the input device can detect movements of a finger, or a hand, on which the input device is worn, as well as manipulations of the input device by a digit, such as a thumb, enabling myriad touch-movement combinations to be translated into a vast array of computing environment controlling actions. In one embodiment, the input device generates event data based on a combination of concurrent gross motor movement (e.g., movement of a hand) and fine motor movement (e.g., movement of a finger across a touch-sensitive surface).

The embodiments disclosed herein may be embodied in any of multiple forms, including, for example, as an apparatus, a system, a method, or a computer program product. Accordingly, one embodiment may be embodied completely in hardware, another in software in conjunction with a processor, and a third as a combination of software and hardware. One embodiment comprises a computer program product embodied in one or more computer readable media having computer readable program code embodied thereon.

Any combination of one or more computer readable media may be utilized. The computer readable medium may be a non-transitory computer readable storage medium or a computer readable signal medium. The non-transitory computer readable storage medium may comprise, for example, but is not limited to, an electronic, magnetic, optical, electromagnetic, infrared, or semiconductor system, apparatus, or device, or any combination of the foregoing. More specific examples (a non-exhaustive list) of the non-transitory computer readable storage medium may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any combination of the foregoing. The non-transitory computer readable storage medium may be any tangible medium that can contain or store a program for use by or in connection with an instruction execution system, apparatus, or device.

The computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable signal medium may be any computer readable medium that is not a computer readable storage medium and that can communicate, propagate, or transport a program for use by or in connection with an instruction execution system, apparatus, or device.

Program code embodied on the computer readable medium may be transmitted using any appropriate medium, including, but not limited to, wireless, wireline, optical fiber cable, radio frequency (RF), etc., or any suitable combination of the foregoing. Computer program code for carrying out operations for aspects of the present embodiments may be written in any combination of one or more programming languages, including an object oriented programming language such as Java, Smalltalk, C++ or the like, or procedural programming languages, such as the C programming language or similar programming languages. The program code may execute entirely on the input device, or partly on the input device and partly on a computing device coupled to the input device, as discussed in greater detail herein. The input device may be communicatively coupled to the computing device through a wired or wireless communications link, such as via Bluetooth®, Wi-Fi®, Universal Serial Bus (USB), or any other means of conveying a control signal from the input device to the computing device.

Aspects of the present embodiments are described below with reference to flowcharts and/or block diagrams of methods, apparatus (systems), and computer program products. It will be understood that each block of the flowcharts and/or block diagrams, and combinations of blocks in the flowcharts and/or block diagrams, can be implemented by computer program instructions.

These computer program instructions may be provided to a processor of the input device, which may be referred to herein as a local processor, such as a general-purpose or special-purpose processor, such that the instructions in conjunction with the processor and other circuitry form a control system that implements the functionality described herein.

FIG. 1A is a perspective view of an input device 10 according to one embodiment. The input device 10 includes a band 12 that comprises an interior surface 14 and an exterior surface 16. The band 12 is preferably configured to at least partially encircle a first digit of a hand. In one embodiment, the interior surface 14 is annular, and is shaped to partially or fully encircle the first digit.

Figure 1B:
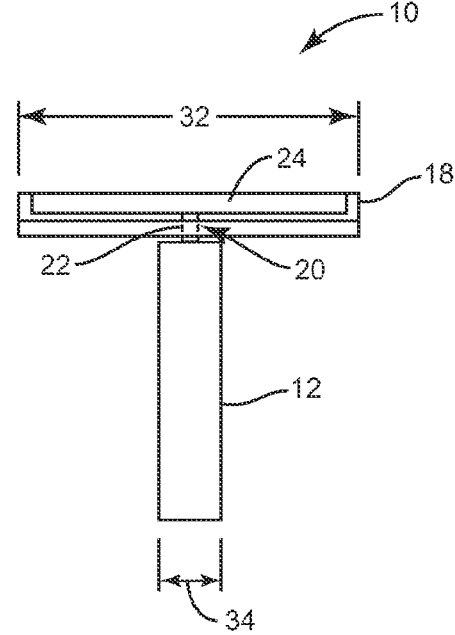
FIG. 1B is a side view of the input device illustrated in FIG. 1A.

Referring to FIG. 1B, the input device 10 includes a platform 18 which is coupled to a first end portion 20 of a connection member 22 and thereby suspended above the exterior surface 16 of the band 12. Referring again to FIG. 1A, the platform 18 may also include one or more input receptors, such as a touch-sensitive surface 24 which, responsive to contact by a second digit, generates receptor data corresponding to attributes of the contact. Such receptor data may include a location of the contact with respect to a reference point of the touch-sensitive surface 24, a pressure of the contact, a rate of movement of the second digit if the second digit subsequently moves across the surface of the touch-sensitive surface 24 in a sliding or swiping motion, and the like.

Manipulations of the touch-sensitive surface 24, or of other input receptors discussed herein, result in the generation of receptor data corresponding to the manipulation. Each input receptor may generate different receptor data depending on the particular manipulation of the respective input receptor. Such receptor data is processed by a processor (not shown in FIGS. 1A-1C) of the input device 10, as described in greater detail herein, to determine event data corresponding to the receptor data. The event data may be the same as the receptor data generated by the input receptor, or may be data that is based on the receptor data. For example, if a touch of the touch-sensitive surface 24 results in the generation by the touch-sensitive surface 24 of binary receptor data such as 0x10FA, the processor may determine that the event data corresponding to the receptor data comprises 0x10FA. Alternately, the processor may access a table that contains translation information that translates the receptor data into different event data. For example, the table may indicate that the receptor data 0x10FA generated by the touch-sensitive surface 24 translates into event data having a value of 0x1213. Ultimately, the determined event data is transmitted by the input device 10 to a communicatively coupled computing device or remote processor or processing device (not shown), which may perform an action in response to receiving the event data.

Different manipulations of input receptors generally result in the determination of different event data. Thus, sliding the second digit across the touch-sensitive surface 24 may generate particular event data, and tapping the touch-sensitive surface 24 may generate different event data. Event data may also identify positional data, magnitude data, speed data, force data, and the like. The input device 10 may generate and send event data consecutively based on a sampling rate, such as 100 times per second. Thus, based on a motion sensor input receptor, for example, during the course of a fluid movement of a user's hand from a first location in space to a second location in space, the input device may continually determine and transmit event data identifying the position of the hand, or the relative position of the hand at each location of the hand at 0.01 second increments. Similarly, as the second digit is moved across the touch-sensitive surface 24, the input device may continually determine and transmit event data identifying the position of the second digit with respect to a reference position of the touch-sensitive surface 24. Thus, event data may be a relatively discrete unit of data, such as that associated with the selection of a button, or may be a consecutive series of data.

Figure 1C:
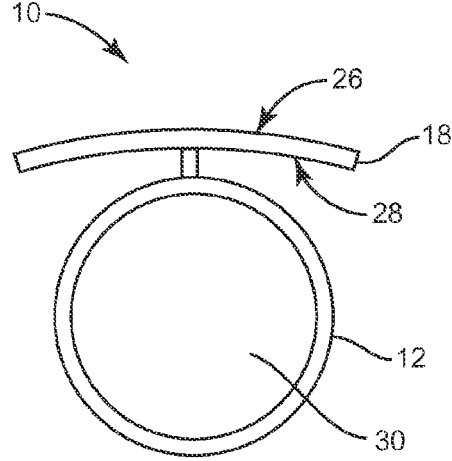
FIG. 1C is an edge view of the input device illustrated in FIG. 1A.

FIG. 1C is a side view of the input device 10, and illustrates that the platform 18 may, in one embodiment, have a convex outer surface 26 and a concave inner surface 28. The band 12 may form an opening 30 through which the first digit may be placed. Preferably, the band 12 is worn on a digit such that the user's thumb may manipulate the platform 18. Such embodiment facilitates single-hand operation of the input device 10.

Referring again to FIG. 1B, while the platform 18 can be implemented in a variety of shapes and sizes, in one embodiment the platform 18 has a dimensional length 32 greater than a width 34 of the band 12. In various embodiments, the platform 18 can be substantially planar, can be curved, or can be otherwise shaped as desired depending on implementation choices. The dimensions of the touch-sensitive surface 24 and the corresponding area may map to the display area of a display (such as display 328 discussed below with reference to FIG. 15A) for controlling the motion of a cursor or other pointer in two dimensions in a graphical user interface (GUI) presented on the display.

Thus, the touch-sensitive surface 24 comprises one type of user interface sensor for controlling the motion of a cursor or other pointer on a display associated with a communicatively coupled computing device.

FIGS. 2A-2B are block diagrams of side views of the input device 10 according to one embodiment. In this embodiment, the platform 18 is pivotally coupled with respect to the first end portion 20 of the connection member 22. As illustrated in FIG. 2A, the platform 18 may be canted (i.e., tilted) in a first direction 36 by the second digit. Canting the platform 18 in the first direction 36 may result in the determination of first event data. Event data that correspond to a canting of the platform 18 may also identify data such as angle of cant, speed at which the platform 18 canted, and the like. As illustrated in FIG. 2B, the platform 18 may also be canted in a second direction 38, which may result in the determination of second event data that differs from the first event data. The first event data and the second event data may be interpreted by the computing device to which the first event data and the second event data are transmitted as corresponding to particular events, such as a left mouse click and a right mouse click, respectively. Canting, and other manipulations, may be performed by one or more digits of a second hand as well. For example, the input device 10 may be worn on a forefinger of one hand, and the thumb and forefinger of the second hand can be used to control the canting of the platform 18 by, for example, placing the thumb on one side of the platform 18 and the forefinger on the other side of the platform 18 and applying a greater pressure on either the forefinger or the thumb to cant the platform 18 in a desired direction.

FIGS. 2C and 2D are block diagrams illustrating edge views of the input device illustrated in FIGS. 2A-2B, and illustrate additional canting of the platform 18 in a third direction 40 and a fourth direction 42. The platform 18 may also be pivotally connected to the first end portion 20 such that the platform may be canted in any direction along a 360° circle about the connection member 22. The platform 18 may also be placed in any position in between, such as perpendicular to the connection member 22, as illustrated in FIGS. 1B and 1C.

Figure 3A:
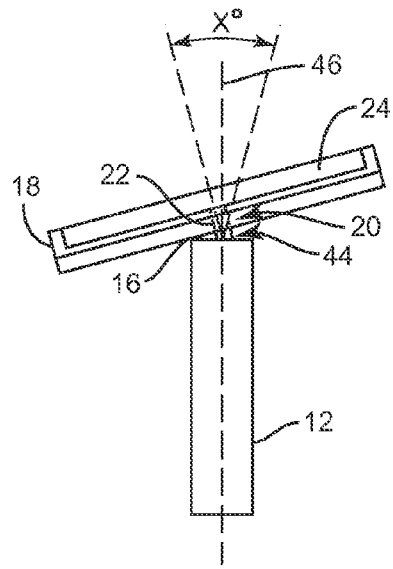
FIGS. 3A-3B are side views of an input device according to another embodiment.
Figure 3B:
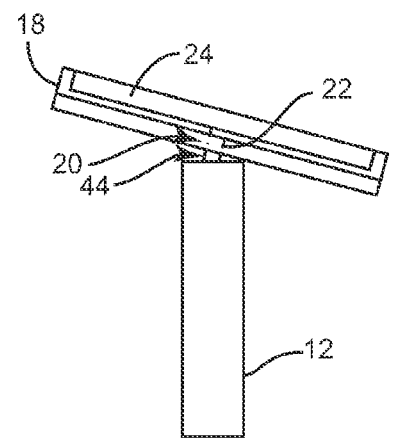

FIGS. 3A-3B are side views of an input device according to another embodiment. In this embodiment, the platform 18 is fixed with respect to the first end portion 20 of the connection member 22, and a second end portion 44 is movably connected with respect to the band 12, which allows the platform 18 to cant with respect to the band 12. In one embodiment, the second end portion 44 includes a sphere (not shown) that fits within a socket formed within the band 12, enabling movement of the connection member 22 within a range of movement of X° with respect to an axis 46 extending through the band 12. The band 12 may comprise a bias member (not shown), such as a compressible material or spring, that urges the connection member 22 to extend at a first angle substantially perpendicular to the band 12, as illustrated by the axis 46. The connection member 22 may be movable with respect to the band 12 against the bias member upon application of a predetermined lateral force by the second digit upon the platform 18, thereby causing the connection member 22 to deviate from the first angle along an arc to a second angle.

Figure 3C:
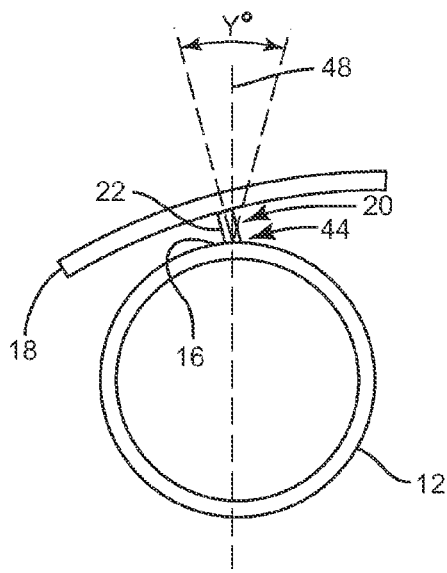
FIGS. 3C-3D are edge views of the input device illustrated in FIGS. 3A-3B.
Figure 3D:
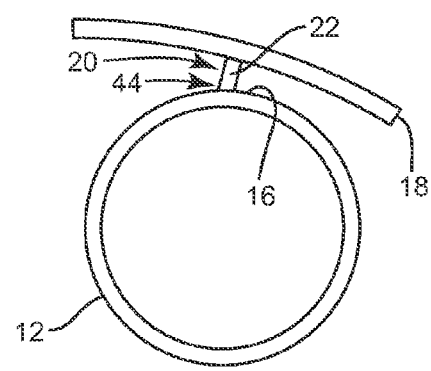

FIGS. 3C-3D are edge views of the input device illustrated in FIGS. 3A-3B, illustrating that the connection member 22 can also move within a range of movement of Y° with respect to an axis 48 extending through the band 12. The movably connected connection member 22 enables continuous movement of the platform in a continuous path about the second end portion 44 of the connection member 22. The continuous movement may result in the continuous generation of receptor data, and determination of a successive series of event data based on the receptor data. The input device may send the event data in a corresponding series of control signals to a communicatively coupled computing device.

FIGS. 4A-4B illustrate the input device in operation, according to one embodiment. The input device 10 may be worn on a first digit 52, such as an index finger of the user. A second digit 54, such as a thumb, may manipulate one or more input receptors carried on the platform 18, such as the touch-sensitive surface 24, to cause the generation of receptor data and determination of event data by the input device 10 for transmission to the communicatively coupled computing device.

Alternately, the input device 10 may be manipulated using the second hand rather than the hand on which the input device is worn. For example, referring again to FIG. 4A, the touch-sensitive surface 24 is oriented on the top side (the side with the fingernail) of the digit on which the input device 10 is worn. In this orientation, a second digit on the second hand of the user may have easy access to the touch-sensitive surface 24. The input device 10 may be rotated to orient the touch-sensitive surface 24 at a variety of intermediary locations around the first digit, and specifically toward the second digit of the same hand to provide easy access to the touch-sensitive surface 24 by such second digit, as shown in FIG. 4B. Nonetheless, the second digit or thumb may have easy access to the touch-sensitive surface 24 when rotated 180° from the position shown in FIG. 4A.

FIG. 5 is a perspective view of an input device 56 according to another embodiment. The input device 56 includes a platform 60 which comprises a touch-sensitive surface 62. A pointing stick 64 is movably mounted with respect to the platform 60. The pointing stick 64 may be pivoted in multiple directions by the second digit 54 (FIG. 4B). Pivoting the pointing stick 64 results in the generation of receptor data, from which event data is determined by the input device 56 and then transmitted to a communicatively coupled computing device. The platform 60 may also include a display 68 upon which output data, such as text or graphics, may be displayed. Such output data may be generated by the input device 56 in response to a manipulation of the touch-sensitive surface 62 or the pointing stick 64, or may be information received from the communicatively coupled computing device.

The input device 56 may include a band 58, which need not completely encircle the first digit, but may instead be implemented as a half-band, a thimble, or another arrangement wearable upon a single digit. Further, the input device 56 may be incorporated with additional wearable components (not shown).

In another embodiment, the input device 56 may include biometric input receptors, such as galvanic skin response sensors, perspiration sensors, heart rate sensors, and the like. Such biometric input receptors may also generate receptor data that is used to determine event data which may then be conveyed to a communicatively coupled computing device. In another embodiment, the input device 56 may include an audio input receptor, such as a microphone, which is able to capture the user's speech, or a sound pressure sensor that is not necessarily suitable for recording speech, but can record the magnitude of proximate sounds. The input device 56 may also include a global positioning system (GPS) or other component (a radio frequency identification (RFID) tag readable by a proximate RFID scanner, for example) that can be used to track a location of the user.

FIG. 6 is a perspective view of an input device 70 according to another embodiment. The input device 70 includes a platform 72 that comprises a touch-sensitive display surface 74 that can both generate receptor data in response to a manipulation of the touch-sensitive display surface 74, and can display information generated by the input device 70, or information received from a communicatively coupled computing device. The touch-sensitive display surface 74 may use projective technologies (e.g., light-emitting diodes (LEDs)) or reflective technologies (e.g., e-ink) to present textual or graphical output. Additionally, the input device 70 may incorporate a constriction component 76, an audio transducer 78, a vibration component 80, a haptic output device 82, a pressure output device (not illustrated), or an electric current outputting component for generating a low-level shock to attract the user's attention, for example.

Materials and construction methods for forming the input devices disclosed herein can vary depending upon intended usage. For example, in situations where the input device is intended to be utilized for extended durations by multiple users (e.g., shared by multiple individuals), the input device can be formed from a durable, yet relatively inexpensive, material like steel or titanium. If the input device is intended to be worn continuously, it may be formed from a precious metal and may optionally include precious or semi-precious gems, thus also functioning as a fashion accessory for the user. If the input device is intended for limited or temporary use, it may be formed from disposable materials, such as plastic, elastic, or the like. If the input device is intended for use by children, it may be formed from a durable and smooth material.

FIG. 7 is a perspective view of an input device 86 according to another embodiment. The input device 86 includes a platform 88 that comprises a touch-sensitive surface 90, two selectable buttons 92, 94, and a wheel 96. Manipulation of the selectable buttons 92, 94 and/or the wheel 96 causes the generation of receptor data identifying the respective manipulation. The input device 86 determines event data based on the receptor data, and transmits the event data to a communicatively coupled computing device. As discussed above, the touch-sensitive surface 90 may serve as a first user interface sensor for controlling a cursor or pointer associated with a communicatively coupled computing device. The two selectable buttons 92, 94 serve as second user interface sensors such as for detecting one-click or two-click event data. The wheel 96 serves as a third user interface sensor to control the GUI of an application, such as by scrolling through the GUI.

Figure 8A:
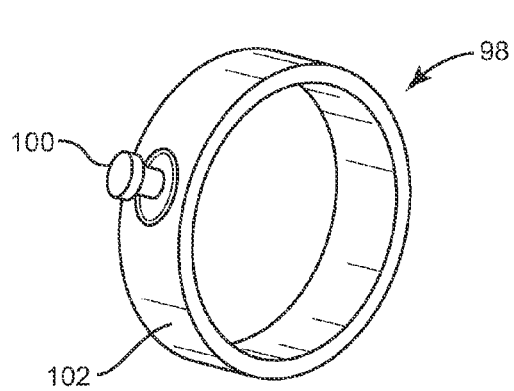
FIGS. 8A-8C illustrate an input device according to another embodiment.
Figure 8B:
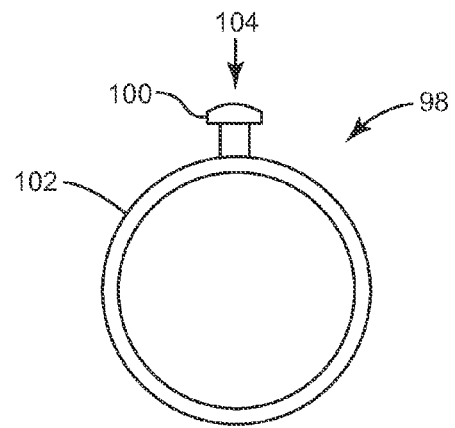
Figure 8C:
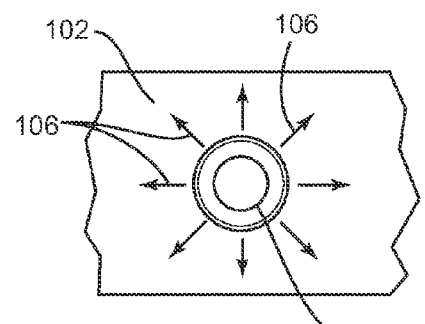

FIG. 8A is a perspective view of an input device 98 according to another embodiment. The input device 98 comprises a pointing stick 100 which projects from a band 102. FIG. 8B is an edge view of the input device 98 illustrated in FIG. 8A. The pointing stick 100 can be pushed in an inward direction 104 and thereby operate as a selectable button. From the perspective of the communicatively coupled computing device (not shown), such operation may, for example, correspond to a left-click of a mouse button. FIG. 8C is a plan view of the input device 98 illustrated in FIGS. 8A-8B. The pointing stick 100 may be tilted and/or moved in any of a plurality of directions 106.

Figure 9:
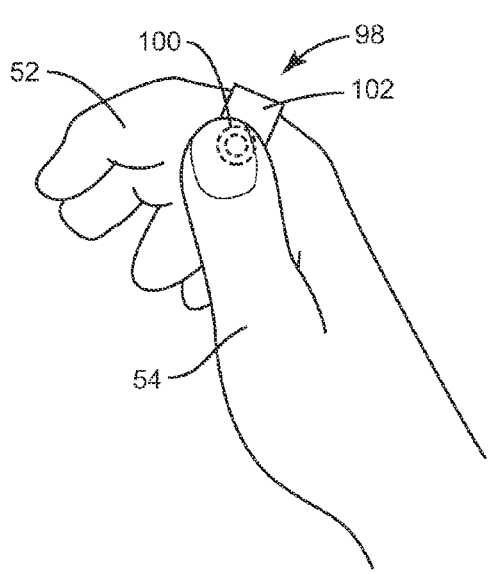
FIG. 9 illustrates the input device shown in FIGS. 8A-8C in operation according to one embodiment.

FIG. 9 illustrates the use of the input device 98 (FIGS. 8A-8C) according to one embodiment. The input device 98 may be worn on the first digit 52 (e.g., an index finger). The second digit 54 (e.g., a thumb) may manipulate the pointing stick 100. Other embodiments are contemplated, wherein digits of the same or the opposing hand can be used to manipulate the pointing stick 100. Further, the input device 98 can be pressed against a surface so that as the first digit 52 moves, the pointing stick 100 moves. The surface can be a standard flat surface (e.g., tabletop, wall, desktop) or can be a specialized surface designed to function with the input device 98.

Figure 10A:
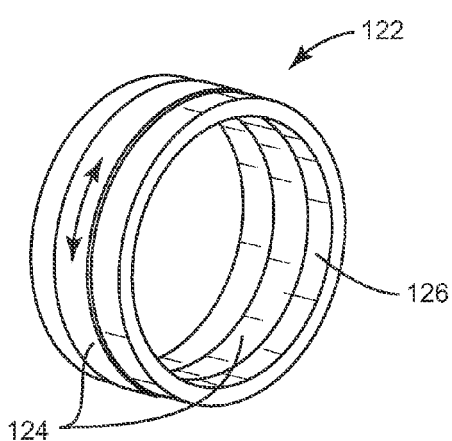
FIGS. 10A-10F are perspective views of input devices according to other embodiments.

FIGS. 10A-10F are perspective views of additional embodiments of input devices. FIG. 10A illustrates an input device 122 in which a rotatable inner ring 124 is positioned within a band 126. In one embodiment, rotating the inner ring 124 can result in the generation of receptor data, and determination of corresponding event data which, when received by a communicatively coupled computing device (not shown), may correspond to scrolling behavior with regard to an active application on the computing device. Alternately, such action may correspond to movement of a cursor on a user interface depicted on the computing device.

Figure 10B:
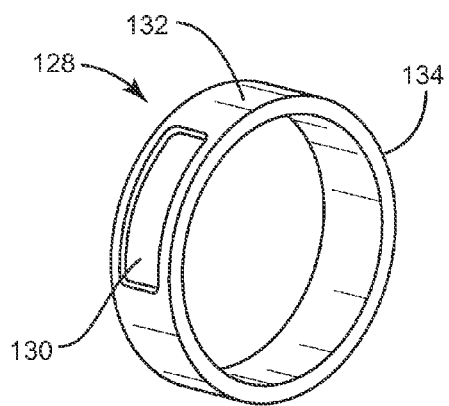
Figure 10C:
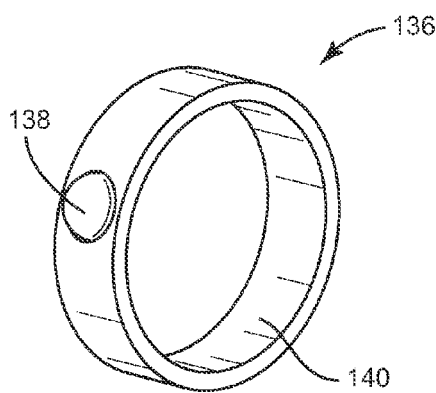

FIG. 10B illustrates an input device 128 in which a touch-sensitive surface 130 is integrated into an exterior surface 132 of a band 134. FIG. 10C illustrates an input device 136 in which a trackball 138 is disposed in a cavity formed in a band 140. In one embodiment, the trackball 138 may be implemented using mechanical, opto-mechanical, optical, inertial, gyroscopic, or three-dimensional (3D) mouse/trackball technologies. Such technologies can use, for example, potentiometers, encoder wheels, LEDs, laser diodes, photodiodes, optoelectronic sensors, or the like. Further, mouse variants, such as two wheels rotating off axes, may be used in place of a ball in a socket.

Figure 10D:
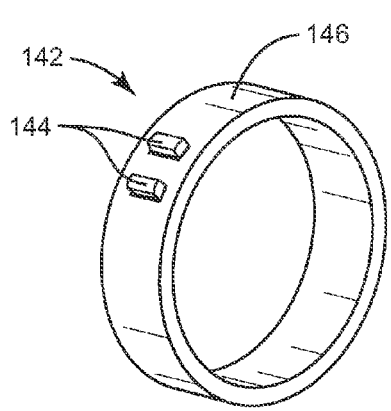

FIG. 10D illustrates an input device 142 in which one or more selectable buttons 144 are positioned in a band 146. In one embodiment, the buttons 144 may be push buttons which use a mechanical switch mechanism. The buttons 144 may be optionally lit (to indicate state) and can optionally provide tactile feedback (pressure or pushback felt when triggered). The buttons 144 may be implemented using a variety of user-triggerable switching technologies that enable the user to intentionally select among two or more discrete states. Thus, the buttons 144 may be implemented using one or more of the following: a toggle switch, a pressure switch, a touch switch (e.g., a capacitance or resistance touch switch), an optical switch, a rotary switch, a centrifugal switch, a tilt switch, a fluid switch, a reed switch, and the like. Further, the buttons 144 can include text, color, graphics, and/or other embellishments as distinguishing characteristics.

Figure 10E:
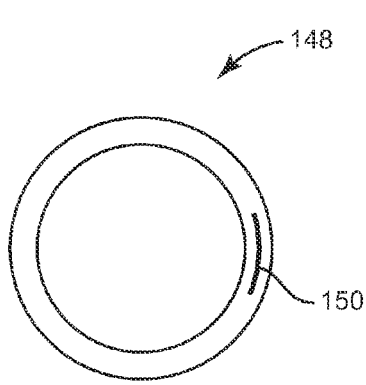

FIG. 10E illustrates an input device 148 comprising a hall effect sensor 150. The hall effect sensor 150 comprises a transducer that varies its output voltage in response to changes in a magnetic field. Hall effect sensors are often used for proximity switching, positioning, speed detection, and current sensing applications. A second input device (not shown) or other surface can be cooperatively used with the input device 148. In another embodiment, the input device 148 may include a magnet that may be detected by a hall effect sensor implemented in a device external to the input device 148 but used in conjunction with the input device 148. For example, the hall effect sensor may be embedded in a "mouse pad" with which the input device 148 is to be cooperatively used.

Figure 10F:
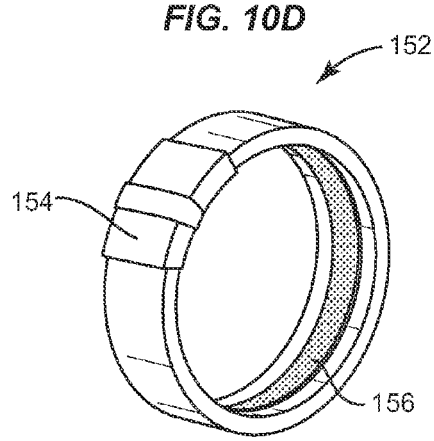

FIG. 10F illustrates an input device 152 comprising an adjustable fastener 154 and padding 156. The adjustable fastener 154 is a mechanism by which the user can secure the input device 152 to his digit. For example, the adjustable fastener 154 may comprise an elastic material, a strap that can be pulled through a cinch, or the like. The adjustable fastener 154 allows the input device 152 to accommodate digits of different diameters. The optional padding 156 can line an interior surface of the input device 152 to aid user comfort, in one embodiment. The padding 156 may be compressible and may also comprise a size adjustment mechanism.

Figure 11:
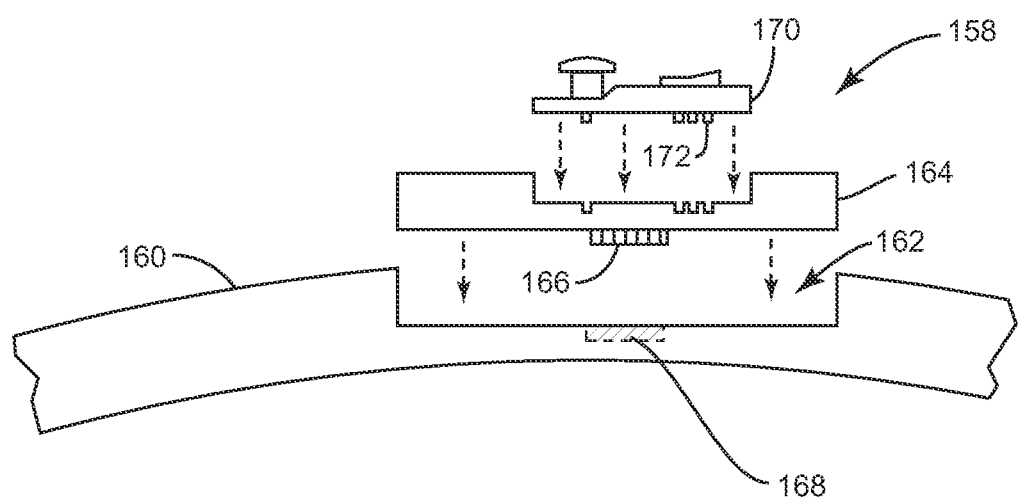
FIG. 11 is a block diagram of a modular assembly embodiment of the input device.

FIG. 11 is a block diagram of a modular assembly of an input device 158 according to another embodiment. The input device 158 enables various input receptors to be "plugged in" to accommodate different users' preferences. A band 160 has one or more indentations 162, within which a variety of different components 164 may be inserted, or plugged. The components 164 may include one or more plugs 166, which mate to an equivalent receptacle 168, which enables electrical communications between the component 164 and components in the band 160, such as a processor (not shown). Input receptor modules 170 may be designed to be nested inside the component 164, also completing an electrical circuit therewith via a plug 172.

The input receptor modules 170 (and/or the components 164) may be manufactured in a variety of functional combinations, allowing users to customize the functionality provided by the input device 158. For example, an input receptor module 170 may include one or more of a trackball, a pointing stick, and a touch-sensitive surface, or the like. In other words, different input receptor modules 170 can be plugged into the component 164 to suit user (or manufacturer) preferences. The pluggable nature of the input receptor module 170 facilitates re-use of the input device 158, provides economy of scale when manufacturing the input device 158, and makes the input device 158 more easily upgraded to incorporate future input receptor technologies.

Figure 12:
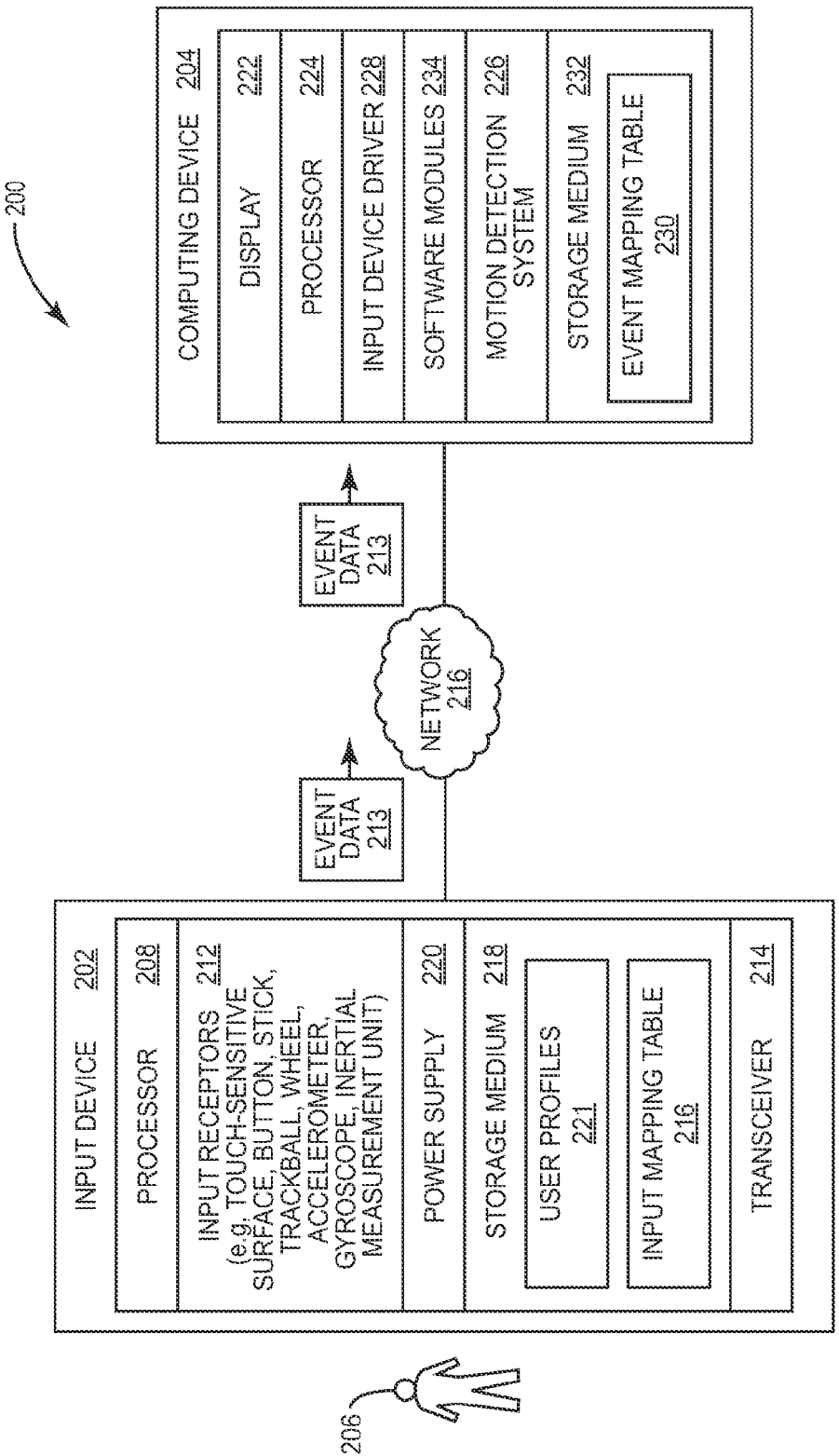
FIG. 12 is a block diagram of a system which includes an input device and a communicatively coupled computing device according to one embodiment.

FIG. 12 is a block diagram of a system 200 which includes an input device 202 and a communicatively coupled computing device 204 according to one embodiment. A user 206 wears the input device 202 on a digit, as discussed previously. The input device 202 may include a processor 208 that is capable of receiving signals from one or more input receptors 212. One type of input receptor 212 may be referred to generally as a motion sensor, and may comprise any suitable mechanism for detecting motion of the digit from a first location in space to a second location in space, such as, for example, an accelerometer; a tilt sensor; a gyroscope; a gravimeter; a combination of such technologies, such as an IMU; or the like. An angular rate sensor may be used in conjunction with an accelerometer to determine an orientation angle of the input device 202. In another embodiment, output components can also be used to provide haptic, audio, and/or visual feedback to the user 206, such as emitting a beeping noise when the power supply is low. Other examples of input receptors or output components may include, but are not limited to, a motion generator, a speaker, LEDs, an audio sensor, a camera, an active pixel sensor (APS), and the like.

Generally, upon detection of motion of the input device 202 from the first location in space to the second location in space, such as may occur when the user 206 moves his hand from one position to another, the motion sensor generates receptor data identifying such motion. The processor 208 receives the receptor data and determines event data 213 associated with the receptor data. The processor 208 then generates a control signal comprising the event data 213 via a transceiver 214, and sends the control signal to the communicatively coupled computing device 204. The transceiver 214 may be an integral RF or optical transmitter and RF or optical receiver, or may comprise a separate RF or optical transmitter and RF or optical receiver.

The event data 213 may travel through a network 216, or may be sent directly to the computing device 204. The network 216 may include any hardware/software/firmware necessary to convey data from the input device 202 to the computing device 204. The transceiver 214 can also allow the input device 202 to receive data from the computing device 204 that can be utilized by, for example, the output components to provide feedback to the user 206. The transceiver 214 can conform to any one or more of a variety of protocols, such as one of the 802.11 family of protocols (e.g., Wi-Fi®, WiMAX, etc.), Bluetooth®, wireless USB, and the like. In embodiments wherein the input device 202 does not process data received from the computing device 204, an RF or optical transmitter may be used in lieu of the transceiver 214.

In one embodiment, the processor 208 may access an input mapping table 216 stored in a storage medium 218 to translate the receptor data generated by an input receptor 212 into the event data 213. Such translation may comprise any desired translation of information from one format or value to another format or value.

As discussed previously, the input receptors 212 may also comprise components that detect manipulations thereof by a digit, such as a touch-sensitive surface, a selectable button, a trackball, or the like. Manipulation of an input receptor 212 by the user 206 causes the input receptor 212 to generate receptor data identifying the manipulation. For example, if the input receptor 212 is a touch-sensitive surface, upon detection of a touch of the input receptor 212 by the digit, the input receptor 212 may generate receptor data identifying a location of the touch with respect to a reference point of the touch-sensitive surface, such as a lower left corner of the touch-sensitive surface, a pressure of the touch, a movement of the touch, or the like. The processor 208 receives the receptor data and determines event data 213 for transmission to the computing device 204. As discussed previously, the event data 213 may be the same as the receptor data, or the receptor data may be translated into event data 213 that differs from the receptor data based on the input mapping table 216.

In one embodiment, concurrent detection of movement by a first input receptor 212, such as an IMU, and detection of a manipulation of a second input receptor 212, such as a touch-sensitive surface, may result in event data 213 that is different from the event data 213 that would otherwise be generated in response to solely the detection of movement by the first input receptor 212, or the manipulation of the second input receptor 212. Such ability to determine event data 213 based on receptor data from a combination of input receptors 212 enables the input device 202 to generate many different kinds of event data 213 which may be used in many novel applications executing on the computing device 204.

The input device 202 also preferably includes a power supply 220. Examples of suitable power supplies 220 include, but are not limited to, a battery, a universal serial bus port and charging cable, an AC/DC port and charging cable, a solar cell, a combination of such technologies, and the like.

In one embodiment, the storage medium 218 stores one or more user profiles 221. A user profile 221 may comprise information that is also stored on the computing device 204 identifying how the event data 213 may be mapped, or translated, by the computing device 204, into action identifiers that define what behavior will occur on the computing device 204 upon receipt of the event data 213. Storing such information on the input device 202 may allow the input device 202 to import or export such information between multiple different computing devices 204. The storage medium 218 may also store additional user information, such as medical information, allergy information, blood type information, or the like, which may be readable by an authorized reading device, and which may, for example, be carried by medical response personnel. User information in the storage medium 218 can also include user-specific passwords, digital certificates, and the like, which may be used to permit the user 206 to unlock a door, run a software module, or perform other human-to-machine interactions. Further, user information may can include Web-based links and/or URLs which identify cloud-based storage repositories and computing assets, which the user 206 may utilize from time to time.

In one embodiment, input device 202 may be a "universal" human interface device designed to function with a variety of different computing devices 204. For example, when the user 206 is in an automobile, the input device 202 may send the event data 213 to a vehicle control system, such as a sound system or a navigation system. When the user 206 is at work, the event data 213 may be used to control a personal computer or other device with which the user 206 interacts. When the user 206 is at home, the input device 202 may be used in place of a remote control for controlling home lighting, entertainment equipment, or the like.

The computing device 204 may comprise one or more personal computing systems, notebook computers, netbook computers, GPS systems, audio systems, entertainment systems, and the like, or may be a processor or processing device coupled with logic that implements desired functionality upon receipt of event data. The computing device 204 may include an integral or separate display 222 upon which information, such as a user interface, may be displayed. In one embodiment, the computing device 204 may be wearable by the user 206. For example, the computing device 204 may be formed as glasses that may be worn by the user 206, wherein the glasses comprise a pair of display screens upon which images are presented to the user 206.

The computing device 204 also comprises a processor 224, which may be any suitable general-purpose or special-purpose processor. The computing device 204 may also include a motion detection system 226. The motion detection system 226 can use image capture, pressure sensing, beam breaking, motion detection, and/or other technologies to detect motion, or movement, by the user 206. The motion detection system 226 may include an active pixel sensor and an infrared projector to determine depth and an RGB camera for imaging and motion. In one embodiment, use of the motion detection system 226 by itself can result in detection of gross motor movement of the user 206, such as a movement of large joints of the user 206. Detection accuracy by the motion detection system 226 may be increased via the receipt of the event data 213 from the input device 202 in combination with data captured by the motion detection system 226, as will be discussed below.

The computing device 204 may also include an input device driver (IDD) 228 for interpreting the event data 213 received from the input device 202. The IDD 228 may provide certain functionality, such as the ability to move a cursor on a user interface, based on the event data 213, and/or may pass the event data 213 (typically via an operating system) to one or more software modules 234 executing on the computing device 204, which in turn may also provide certain functionality based on the event data 213. For example, as discussed above, movement of the hand of the user 206 from a first location in space to a second location in space may result in the transmission of a series of event data 213 from the input device 202 to the computing device 204 that identifies such movement. Upon receipt of the event data 213, the IDD 228 may cause a cursor depicted in a user interface to move in a same direction as the hand movement, and at a speed with respect to the movement of the hand. In one embodiment, the IDD 228 may comprise a standard mouse device driver if the computing device 204 only expects inputs associated with a conventional mouse input device. In another embodiment, the IDD 228 implements actions based on event data 213 that are unique with respect to the input device 202.

Upon receipt of event data 213, the IDD 228 may access an event mapping table 230 stored in a storage medium 232, and may generate an action identifier based on the event data 213. The action identifier may be passed to one or more software modules 234 executing on the computing device 204. The one or more software modules 234 may provide certain functionality to the user 206 in response to receipt of the action identifier. Some software modules 234 may be designed to provide functionality based on the event data 213, and other software modules 234 may not.

Figure 13:
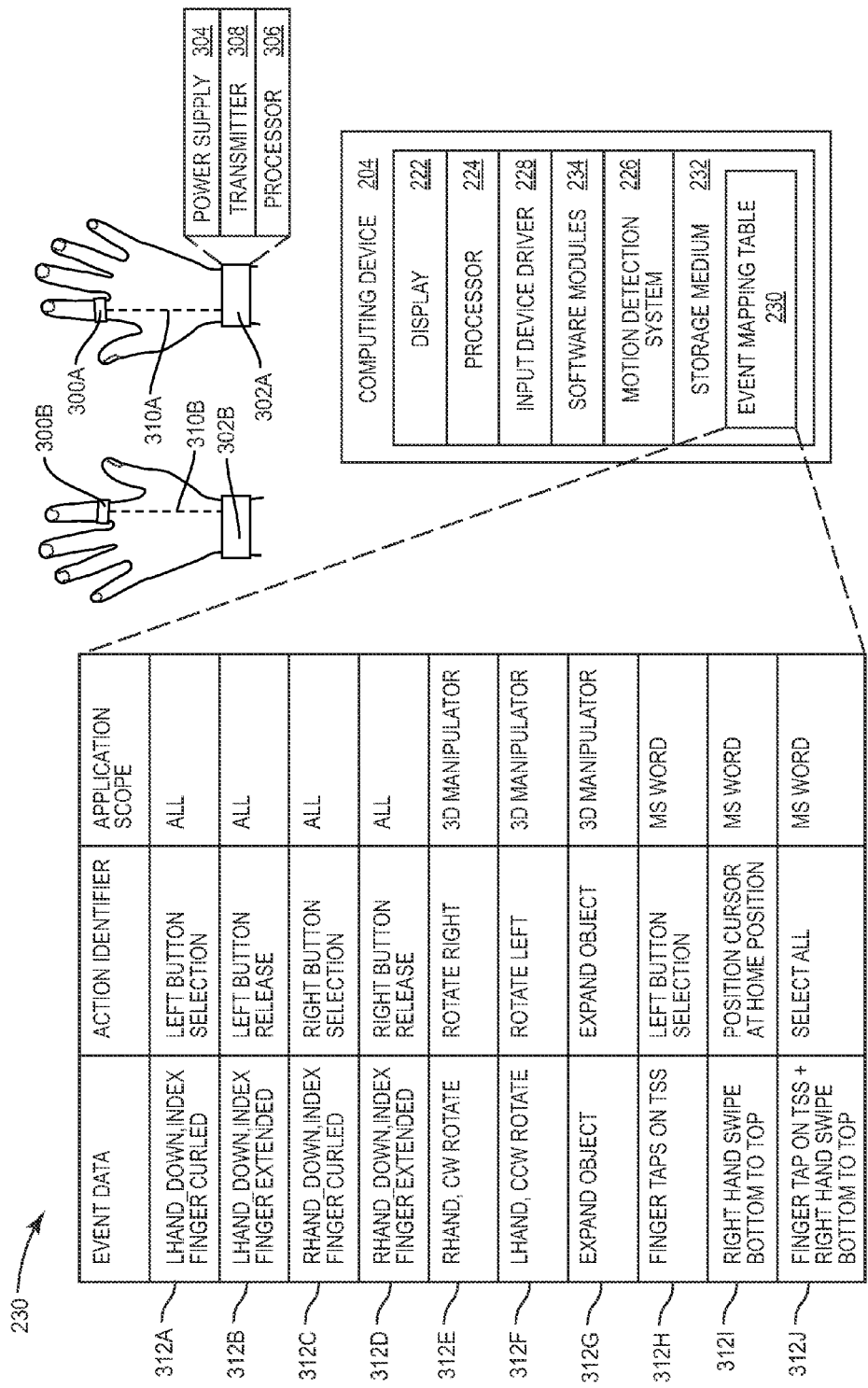
FIG. 13 illustrates a system in which multiple input devices may be worn by a user, according to one embodiment.

FIG. 13 illustrates a system in which multiple input devices may be worn by a user, according to one embodiment. In this embodiment, the user 206 wears an input device 300A on a right hand and an input device 300B on a left hand (generally, input devices 300). The input devices 300 may be configured with one or more input receptors including, for example, a touch-sensitive surface, a trackball, a pointing stick, or the like. Assume that the input devices 300 are also configured with a motion sensor input receptor (FIG. 12), such as an accelerometer and/or a gyroscope, such that movements of the left hand or right hand, or even movements of the individual digits on which the input devices 300 are respectively worn, may be determined. In one embodiment, the input devices 300 are each coupled to a corresponding wrist strap 302A, 302B. The wrist strap 302A may include certain components which may aid in reducing an overall form factor of the input device 300A, such as a power supply 304, a processor 306, and an RF transmitter 308. A communications path 310A may couple input receptors on the input device 300A with the wrist strap 302A. The wrist strap 302B may be similarly configured, and similarly coupled to the input device 300B via a communications path 310B. The communications paths 310A, 310B may comprise, for example, a conductive wire embedded in a glove, or may comprise a wireless communications path via a wireless technology, such as Bluetooth® or the like.

The processor 306 receives receptor data generated by one or more input receptors of the input device 300A in response to a manipulation or a movement of the input receptors, determines event data associated with such receptor data, as described above, and transmits the event data to the computing device 204 via the transmitter 308. A similar process may occur with respect to the input device 300B and corresponding processor and transmitter in the wrist strap 302B. The IDD 228 receives the event data and accesses the event mapping table 230. The event mapping table 230 may be stored in any suitable data structure and may comprise any suitable format for translating event data to a desired action identifier on the computing device 204. One such suitable structure is depicted in FIG. 13. The event mapping table 230 comprises a plurality of entries 312A-312J (generally, entries 312), each of which maps event data received from the input devices 300 to a desired action identifier. While ten entries 312 are depicted, the event mapping table 230 may include hundreds or thousands of event entries 312, depending, at least in part, on the number of different types of event data that may be received from the input devices 300.

Each entry 312 may identify particular event data, or a combination of event data, which may be received from an input device 300, the particular action identifier to which the event data is mapped, and the software modules 234 to which the action identifiers may pertain. Thus, some event data may be processed by some software modules 234, but may be ignored by other software modules 234.

For example, assume that the user 206 moves his left hand downward while simultaneously curling his left index finger. Such movements cause the input receptors in the input device 300B to generate receptor data. The input device 300B determines event data identified as "LHAND_DOWN, INDEX FINGER CURLED" and transmits the event data to the computing device 204. While the event data illustrated in the mapping table 230 is shown in text for purposes of illustration, the event data that corresponds to "LHAND_DOWN, INDEX FINGER CURLED" may in fact comprise a particular bit pattern, such as 0x 121A. As indicated in entry 312A, such event data may be translated in accordance with the event mapping table 230 to an action identifier of "LEFT BUTTON SELECTION" (e.g., a depression of a left mouse button). This action identifier may then be provided to the particular software module 234 which is currently "active" on the computing device 204, which in turn may provide particular functionality consistent with the user 206's depression of a left mouse button on a conventional mouse.

A motion wherein the user 206 moves his left hand downward and extends his left index finger may be translated in accordance with the entry 312B to a "LEFT BUTTON RELEASE." A motion wherein the user 206 moves his right hand downward and curls his right index finger may be translated in accordance with the entry 312C to a "RIGHT BUTTON SELECTION." A motion wherein the user 206 moves his right hand downward and extends his right index finger may be translated in accordance with the entry 312D to a "RIGHT BUTTON RELEASE." Each of these action identifiers may be applicable to any software module 234 which is currently active.

In contrast, the entries 312E-312G may apply to only certain software modules 234, such as a 3D manipulation application. For example, the software module 234 may comprise software that provides, via a stereoscopic display technology, stereoscopic imagery that is perceivable by the user 206 as a 3D image, at least a portion of which is perceived to be between the user 206 and the plane of the display 222. Event data received from the input device 202 that indicates that the user 206 has rotated his right hand clockwise (CW) may be translated into a "ROTATE RIGHT" action identifier. In response to the receipt of such action identifier, the software module 234 may rotate the stereoscopic image in a clockwise direction with respect to the perspective of the user 206. Event data received from the input device 202 that indicates that the user 206 has rotated his left hand counterclockwise (CCW) may be translated into a "ROTATE LEFT" action identifier. In response, for example, the software module 234 may rotate the stereoscopic image in a counterclockwise direction with respect to the perspective of the user 206.

The entry 312G translates event data identified as an "EXPAND OBJECT" into an "EXPAND OBJECT" action identifier that may cause the software module 234 to enlarge the 3D object being displayed to the user 206. The "EXPAND OBJECT" event data may be an example of event data generated by the input devices 300 based on multiple inputs of one or both of the input devices 300. For example, a movement of the input device 300A rapidly from right to left while concurrently double tapping a touch-sensitive screen may be determined by the input device 300A to be an "EXPAND OBJECT" event data which is then transmitted to the computing device 204.

Entries 310H-310J may apply to certain software modules 234 that process text, such as the Microsoft® Word® word processing application. Event data received from the input device 202 that indicates that the user 206 tapped a finger on a touch-sensitive surface may be translated into a "LEFT BUTTON SELECTION" action identifier. Event data received from the input device 202 that indicates that the user 206 moved his right hand in a swiping motion from a first location to a second location that is higher than the first location may be translated into a "POSITION CURSOR AT HOME POSITION" action identifier. Event data received from the input device 202 that indicates that the user 206 tapped a finger on the touch-sensitive surface while concurrently moving his right hand in a swiping motion from the first location to the second location that is higher than the first location may be translated into a "SELECT ALL" action identifier. In this manner, the input device 300 may generate a large number of different types of event data based on any desired single manipulation or combination of manipulations of the input device 300, which in turn may be translated into both conventional or novel action identifiers to affect the behavior of software modules 234 executing on the computing device 204.

While only exemplary event data and action identifiers have been discussed for purposes of illustration, it will be apparent that myriad different event data may be determined by the input device 300 and translated into myriad action identifiers, including those associated with conventional mouse events, such as a mouse-up event, a mouse-down event, a mouse-right event, and a mouse-left event. In one embodiment, the input devices 300 may determine a relative distance between the input devices 300, and generate event data based on such relative distance. For example, the user 206 may place his hands relatively close to one another and slowly move them apart, and event data identifying the increasing distance between the hands may be communicated to the computing device 204, where such event data may cause certain behavior on the computing device 204 by a software module 234 or the input device driver 228.

Figure 14:
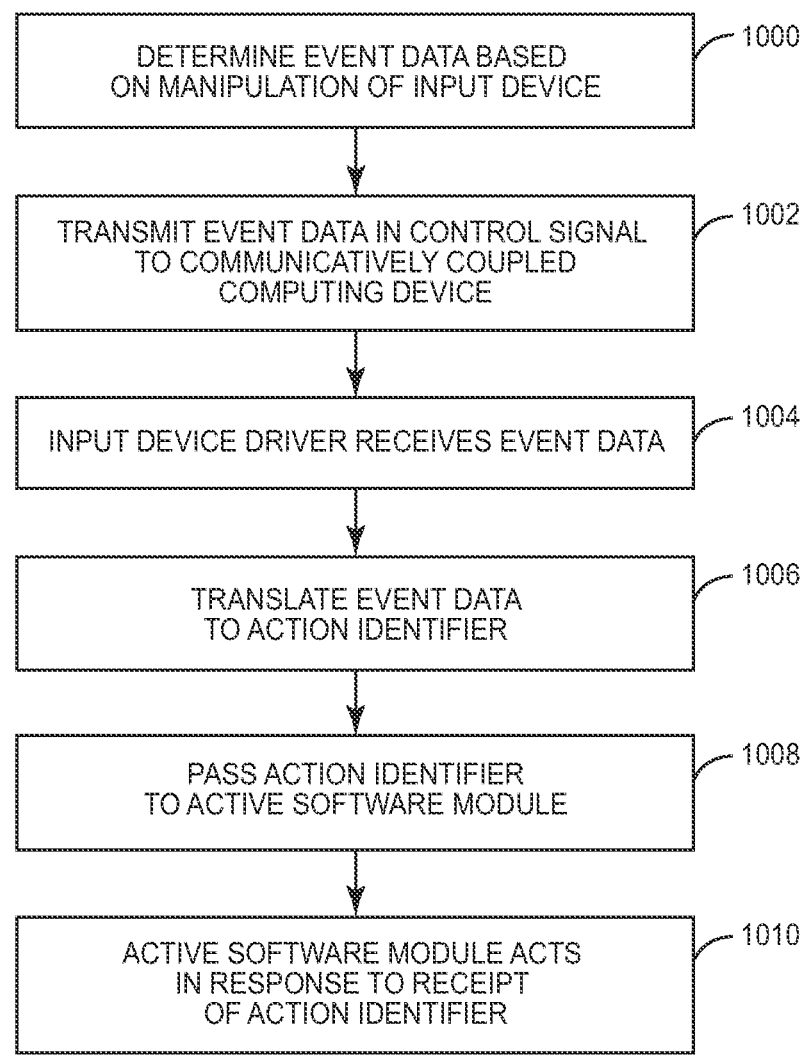
FIG. 14 is a flowchart of an exemplary process for generating event data and communicating the event data to a communicatively coupled computing device according to one embodiment.

FIG. 14 is a flowchart of an exemplary process for generating event data and communicating the event data to a communicatively coupled computing device according to one embodiment. FIG. 14 will be discussed in conjunction with FIG. 13. Assume that the user 206 (FIG. 13) manipulates the input device 300A by touching a touch-sensitive surface input receptor on the input device 300A with his thumb. The touch-sensitive surface input receptor generates receptor data that identifies the particular manipulation. The input device 300A determines event data based on the receptor data generated by the manipulation of the touch-sensitive surface input receptor (step 1000). The input device 300A transmits the event data in a control signal to the computing device 204 (step 1002). The IDD 228 receives the event data (step 1004). The IDD 228 accesses the event mapping table 230 and determines an action identifier associated with the event data (step 1006). The action identifier is provided to an active software module 234 (step 1008). The active software module 234 receives the action identifier and performs an action in response to the receipt of the action identifier (step 1010).

Figure 15A:
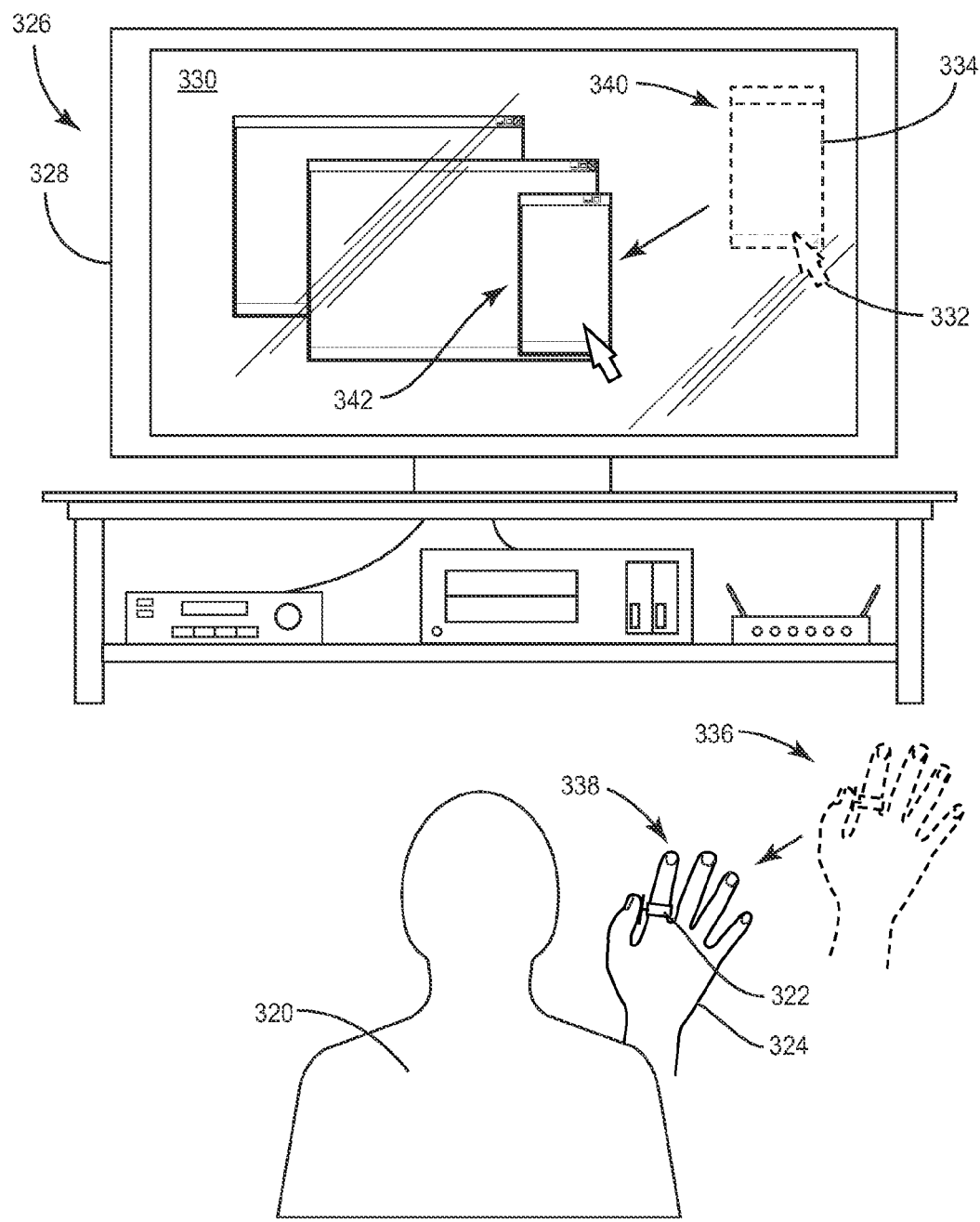
FIGS. 15A-15C illustrate the use of an input device in conjunction with a motion detecting system according to one embodiment.
Figure 15B:
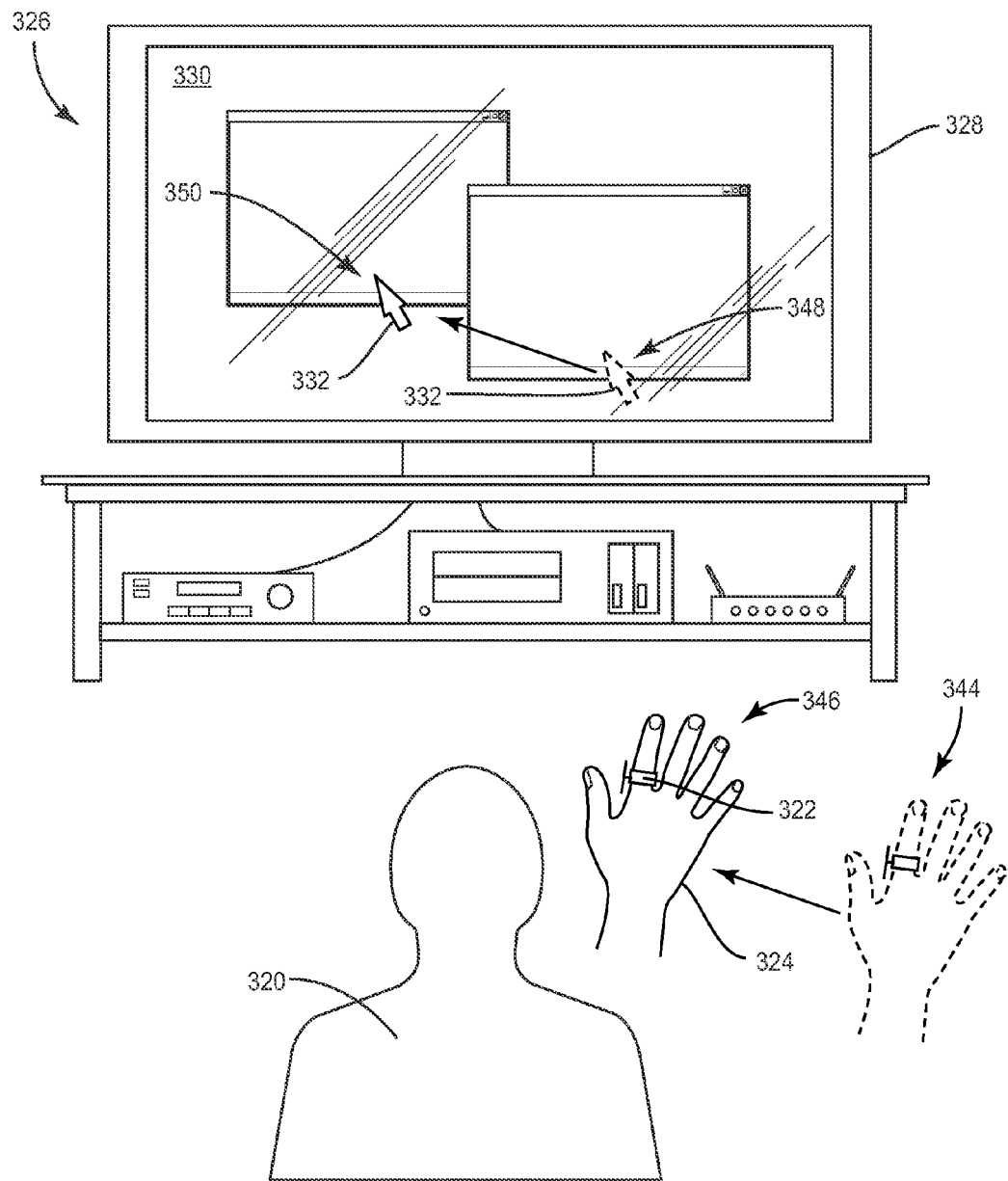
Figure 15C:
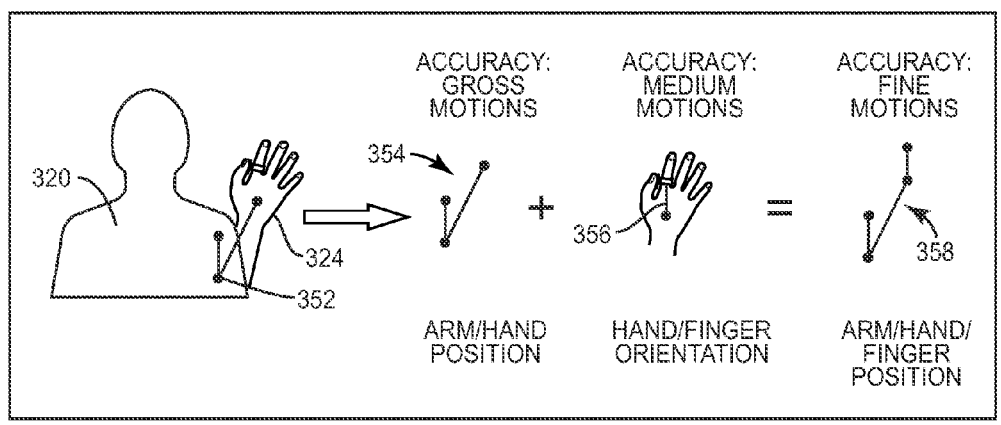

FIGS. 15A-15C illustrate the use of the input device in conjunction with a motion detecting system according to one embodiment. Referring to FIG. 15A, a user 320 wears an input device 322 on a right hand 324. Assume that the input device 322 includes a plurality of input receptors, including a touch-sensitive surface, right and left selection buttons, and an IMU operable to detect movement and orientation of the input device 322. The user 320 faces a computing device 326 that includes a display 328 on which a user interface 330 is depicted. The user interface 330 includes a cursor 332 that is positioned over a dialog box 334. Assume the user 320 touches a left button on the input device 322, and moves the right hand 324 from a first location in space 336 to a second location in space 338 while continuing to press the left button. Such manipulations result in input receptors in the input device 322 generating receptor data identifying such manipulations. In particular, the receptor data identifies the depression of the left button and the movement of the right hand 324.

Based on the receptor data generated by the manipulations, the processor determines event data and transmits the event data to the computing device 326. An IDD executing on the computing device 326 receives the event data. In this example, the IDD determines that the event data comprises data identifying the depression of the left button, and the movement of the input device 322 from the first location in space 336 to the second location in space 338. Such event data may comprise a series of transmissions of event data, based on a sampling rate of the input device 322 as the right hand 324 moves from the first location in space 336 to the second location in space 338.

In response to the event data identifying the depression of the left button, an action identifier identifying the event data as a "LEFT BUTTON SELECTION" may be determined and provided to a software module executing on the computing device 326. In response, because the cursor 332 is positioned over the dialog box 334, the software module may interpret the "LEFT BUTTON SELECTION" as a selection of the dialog box 334. As the event data identifying the movement of the right hand 324 from the first location in space 336 to the second location in space 338 is received, the software module (and/or IDD) may move the dialog box 334 from a location 340 to a location 342 in the user interface 330. This is an example where fine motor movement (i.e., the depression of a button) in combination with gross motor movement (i.e., movement of the right hand 324), results in the generation of event data that results in a very intuitive interaction with a software module executing on the computing device 326.

Referring to FIG. 15B, assume that the user 320 simply moves his right hand 324 from a first location in space 344 to a second location in space 346. Such movement results in receptor data being received by a processor in the input device 322. The processor determines event data based on the receptor data, and transmits the event data to the computing device 326. An IDD executing on the computing device 326 receives the event data. In this example, the IDD determines that the event data comprises data identifying the movement of the input device 322 from the first location in space 344 to the second location in space 346. In response, the IDD moves the cursor 332 depicted in the user interface 330 from a first location 348 to a second location 350. The movement of the cursor 332 from the first location 348 to the second location 350 corresponds in direction and preferably in velocity with the movement of the input device 322 from the first location in space 344 to the second location in space 346. Thus, the cursor 332 moves across the user interface 330 substantially in correspondence with a movement of the input device 322 relative to the display 328.

Thus, the input device 322 can provide the user 320 with a way to interact with the computing device 326 that utilizes movements that can be considered relatively natural. For example, when reading a document or presentation displayed in the user interface 330, the user 320 can simply wave his right hand 324, as if turning the page, to cause the user interface 330 to depict a subsequent page of the document or presentation.

In another embodiment, the computing device 326 may include the motion detection system 226 (FIG. 12), and in conjunction with the input device 322, the computing device 326 may be able to recognize a wide range of movements from the user 320. FIG. 15C is a diagram illustrating different types of movements that may be recognized in such a computing environment. An arm 352 of the user 320 can be recognized by the motion detection system 226 as a series of jointed segments 354 like those used in skeletal computer animations. The series of jointed segments 354 can provide the motion detection system 226 with information about the position of the arm 352 and the right hand 324. As such, the motion detection system 226 may require the user 320 to make relatively large motions with the arm 352 and/or the right hand 324 in order for such motions to be detected by the motion detection system 226.

In one embodiment, the input device 322 (FIGS. 15A-15B) adds another segment 356 to the skeletal representation of the user 320 that can provide, for example, an orientation of the right hand 324 and the digit with respect to the arm 352. For example, this may enable determination of a "palm up" or "palm down" motion by the user 320. Changes in position and/or orientation made by the right hand 324 with the input device 322 may be classified in this embodiment as "medium" motions with respect to the "gross" motions which may be necessary for the motion detection system 226 to detect a change in position of the arm 352.

The motion detection system 226 may use the gross motion detected by the motion detection system 226 and the "medium" motion determined via the input device 322 to create a composite representation 358 that can capture "fine" motions. Such composite representation 358 may increase the number of movements that can be recognized and interpreted by the computing device 326 (FIGS. 15A-15B).

For example, rotation of the right hand 324 above a rest position may be interpreted as an action intended to change the volume of the front speakers of a five speaker sound system. Rotation of the right hand 324 below the rest position may be interpreted as an action intended to change the volume of the rear speakers, and rotation of the right hand 324 at the rest position may be interpreted as an action intended to control the volume of a subwoofer. Additional motions or movements may be interpreted as actions intended to adjust a bass level for each set of speakers, or the like.

In another embodiment, gross motor movements may be translated into smaller, precise motions with respect to the computing device 326 to allow for precise positioning of a cursor. For example, the input device 322 may be used, such as by moving a finger across a touch-sensitive surface of the input device 322, to move a cursor across the user interface 330 to an area of the user interface 330. A second manipulation of the input device 322, such as a tap of the touch-sensitive surface, may "lock" the cursor and thereby indicate to the computing device that subsequent gross motor movements, such as a movement of the right hand 324, will be used for further fine positioning of the cursor. The motion detection system may then translate detected large gross motor movements, such as the movement of the right hand 324, to smaller, precise movements of the cursor that correspond to the movement of the right hand 324, to allow for fine positioning of the cursor in the area. For example, after the cursor has been "locked," each 12-inch movement of the right hand 324 may translate into a 1-inch movement of the cursor on the user interface 330, allowing for fine, precise control of the cursor within the area.

FIG. 16 is a diagram illustrating use of the input device 322 in conjunction with a gaming system, according to one embodiment. In this embodiment, a computing device 360 comprises a gaming console, such as Microsoft® Xbox® gaming console or Sony® PlayStation® gaming console. The computing device 360 is coupled to a display 362, such as a television, and includes a motion detection system that uses, at least in part, a camera 364 to detect movement of the user 320. The body of the user 320 can be detected by the motion detection system, and the computing device 360 depicts a representation 366 of the user 320 on the display 362. In conventional gaming systems, distance and movement speed of a user can be a source of problems in the recognition of body elements, especially smaller body elements such as digits. Thus, in a conventional gaming system, the user 320 may need to be positioned relatively close to the display 362 when playing a game that utilizes digit motions as inputs.

Such close positioning can be problematic however, particularly when a game involves relatively large, sweeping movements, such as in a combat simulation where the user 320 may be expected to act out combat motions. Use of the input device 322, however, can alleviate the need for closer positioning by providing event data that identifies movements of digits of the user 320. Thus, the computing device 360 may utilize event data generated by the input device 322 in lieu of data from the motion detection system with respect to digit motions, for example. This may allow the user 320 to perform large motions at a safer distance from the display 362 even though such distance is outside the detection range of the motion detection system.

The flowchart and block diagrams discussed herein illustrate the architecture, functionality, and operation of possible implementations of devices, systems, methods, and computer program products according to various embodiments disclosed herein. In this regard, each block in the flowchart or block diagrams may represent a module, segment, or portion of code, which comprises one or more executable instructions for implementing the specified logical function(s). It should also be noted that in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, may be implemented by special-purpose hardware-based systems that perform the specified functions or acts, or combinations of special-purpose hardware and computer instructions.

Those skilled in the art will recognize improvements and modifications to the preferred embodiments of the present disclosure. All such improvements and modifications are considered within the scope of the concepts disclosed herein and the claims that follow.

What is claimed is:

1. An input device configured to control a communicatively coupled remote processor, comprising:
    a band configured to at least partially encircle a first digit of a hand;
    a platform configured to be manipulated by a second digit, the platform pivotally coupled to a first end portion of a connection member and suspended above an exterior surface of the band via the connection member, a second end portion of the connection member coupled to the band;
    a transmitter;
    a processor configured to:
        determine first event data in response to a first manipulation of the platform, the first event data based on the first manipulation;
        transmit, via the transmitter, a control signal comprising the first event data to the communicatively coupled remote processor.

2. The input device of claim 1, wherein the platform comprises a substantially planar touch-sensitive surface, and wherein the first manipulation comprises a touch of the substantially planar touch-sensitive surface by the second digit.

3. The input device of claim 1, wherein the first manipulation comprises a canting of the platform with respect to the connection member.

4. The input device of claim 1, wherein the platform is pivotally coupled with respect to the first end portion of the connection member to allow the platform to cant with respect to the connection member in any of a plurality of different directions, and wherein the first event data is based on a canting of the platform in a first direction, and second event data is based on a canting of the platform in a second direction.

5. The input device of claim 1, wherein the platform comprises a convex outer surface.

6. The input device of claim 5, wherein the convex outer surface comprises a touch-sensitive surface.

7. The input device of claim 1, wherein the second end portion of the connection member is movably connected with respect to the band.

8. The input device of claim 7, further comprising a bias member that urges the connection member to extend at a first angle from the band, the connection member movable with respect to the band against the bias member upon application of a predetermined lateral force by the second digit upon the platform, thereby causing the connection member to deviate from the first angle along an arc to a second angle.

9. The input device of claim 8, wherein the connection member is further movably connected with respect to the band to enable movement of the platform in a continuous path about the second end portion of the connection member.

10. The input device of claim 9, wherein the processor is further configured to detect a continuous movement of the platform in the continuous path about the second end portion of the connection member, and in response, to determine a successive series of events based on a position of the platform in the continuous path, and to transmit, via the transmitter, a corresponding series of control signals comprising event data identifying the continuous movement.

11. The input device of claim 1, further comprising a motion sensor configured to detect movement of the input device from a first location in space to a second location in space.

12. The input device of claim 11, wherein the motion sensor determines a velocity and a direction of the movement, and wherein the first event data comprises the velocity and direction.

13. The input device of claim 11, wherein the motion sensor comprises one of an accelerometer and a gyroscope.

14. The input device of claim 11, wherein the motion sensor comprises an inertial measurement unit (IMU) comprising an accelerometer and a gyroscope.

15. The input device of claim 11, wherein the processor is further configured to:
    determine second event data in response to the movement of the input device from the first location in space to the second location in space, the second event data based on the movement;
    generate a second control signal comprising the second event data; and
    transmit the second control signal via the transmitter to the communicatively coupled remote processor.

16. The input device of claim 11, wherein the processor is further configured to:
    determine second event data in response to the movement of the input device from the first location in space to the second location in space, the second event data based on the movement and determined substantially concurrently with the determination of the first event data, and wherein the control signal comprises the first event data and the second event data.

17. The input device of claim 11, wherein the first event data is based on both the first manipulation and the movement of the input device from the first location in space to the second location in space.

18. The input device of claim 1, further comprising an RF receiver, and wherein the platform comprises a display configured to present data received via the RF receiver.

19. The input device of claim 1, wherein the platform comprises a first selectable button, and wherein the first manipulation of the platform comprises a selection of the first selectable button.

20. The input device of claim 1, wherein the platform has a length and a width, the width being greater than a width of the band.

21. A method for sending event data, comprising:
   determining first event data in response to a first manipulation of a platform, the platform configured to be manipulated by a second digit of a hand, the platform pivotally coupled to a first end portion of a connection member and suspended above an exterior surface of a band via the connection member, a second end portion of the connection member coupled to the band, the band configured to at least partially encircle a first digit of a hand; and
   transmitting, via a radio frequency (RF) transmitter, a control signal comprising the first event data to a communicatively coupled processing device.

22. A ring peripheral comprising a band configured to be worn on at least one digit of a human's hand, the ring peripheral comprising a pivotable platform that is suspended above an exterior surface of the band, the ring peripheral configured to detect a manipulation of the platform comprising a rotation of the platform in a first direction, and in response thereto to convey event data identifying the manipulation within a signal to a communicatively coupled processing device, wherein the event data controls a movement of a stereoscopic image of an object depicted on the communicatively coupled processing device and perceivable by the human as a three-dimensional (3D) object, the movement comprising a rotation of the 3D object in the first direction.

23. The ring peripheral of claim 22, wherein the at least one digit comprises an index finger, and wherein the platform is operable to be manipulated by a thumb of the hand when the ring peripheral is worn on the index finger.

24. The ring peripheral of claim 22, wherein the ring peripheral is further configured to detect a plurality of different manipulations of the platform, to determine a plurality of event data based on the plurality of different manipulations, and to convey the plurality of event data to the communicatively coupled processing device, wherein the plurality of event data correspond to at least a left mouse click, a mouse-up event, a mouse-down event, a mouse-right event, and a mouse-left event.

25. The ring peripheral of claim 22, further comprising:
   a wrist strap connected via conductive wires to the ring peripheral, the wrist strap comprising an RF transmitter, and wherein the RF transmitter conveys the event data identifying the manipulation within the signal to the communicatively coupled processing device.

26. The ring peripheral of claim 22, wherein the communicatively coupled processing device comprises glasses adapted to be worn by the human, the glasses comprising a pair of display screens upon which images are presented.

27. The ring peripheral of claim 22, wherein the ring peripheral is configured to detect a second manipulation of the platform that comprises a rotation of the platform in a second direction, and in response the 3D object is rotated in the second direction.

28. A ring peripheral comprising a band configured to be worn on at least one digit of a human's hand, the ring peripheral comprising a pivotable platform that is suspended above an exterior surface of the band, the pivotable platform comprising a touch-sensitive surface, the ring peripheral configured to detect a manipulation of the platform comprising a movement of the platform from a first location to a second location and a concurrent tap of the touch-sensitive surface during the movement, and in response thereto to convey event data identifying the manipulation within a signal to a communicatively coupled processing device, wherein the event data controls a movement of a stereoscopic image of an object depicted on the communicatively coupled processing device and perceivable by the human as a three-dimensional (3D) object.

29. The ring peripheral of claim 28, wherein the movement of the stereoscopic image comprises an enlargement of the 3D object.

* * * * *